United States Patent
Boitard et al.

(10) Patent No.: US 9,489,726 B2
(45) Date of Patent: Nov. 8, 2016

(54) METHOD FOR PROCESSING A VIDEO SEQUENCE, CORRESPONDING DEVICE, COMPUTER PROGRAM AND NON-TRANSITORY COMPUTER-READABLE-MEDIUM

(71) Applicant: THOMSON LICENSING, Issy de Moulineaux (FR)

(72) Inventors: Ronan Boitard, Belz (FR); Dominique Thoreau, Cesson Sevigne (FR); Yannick Olivier, Thorigne Fouillard (FR); Philippe Guillotel, Vern sur Seiche (FR)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/659,942

(22) Filed: Mar. 17, 2015

(65) Prior Publication Data

US 2015/0269714 A1  Sep. 24, 2015

(30) Foreign Application Priority Data

Mar. 18, 2014 (EP) .................................... 14305379

(51) Int. Cl.
*G06T 5/00* (2006.01)
*H04N 5/232* (2006.01)
(Continued)

(52) U.S. Cl.
CPC ............. *G06T 5/009* (2013.01); *H04N 5/2351* (2013.01); *H04N 5/23238* (2013.01); *H04N 5/243* (2013.01); *G06T 2207/10016* (2013.01); *G06T 2207/20208* (2013.01)

(58) Field of Classification Search
CPC .................... G06T 5/009; G06T 2207/10016; G06T 2207/20208; H04N 5/23238; H04N 5/2351; H04N 5/243
See application file for complete search history.

(56) References Cited

U.S. PATENT DOCUMENTS

2005/0057670 A1  3/2005  Tull et al.
2005/0093995 A1  5/2005  Yoshida
(Continued)

FOREIGN PATENT DOCUMENTS

WO  WO2014131755  9/2014

OTHER PUBLICATIONS

Boitard et al:"Zonal brightness coherency for video tone mapping"; Signal Processing: Image Communication, vol. 29, No. 21 Feb. 20140 (Feb. 1, 2014)pp. 229-246.
Kang et al: "High dynamic range video" ACM Transactions on GraphicsProceeding of ACM SIGGRAPHvol. 22, Issue 33, pp. 319-325; Jul. 1, 2003.
(Continued)

*Primary Examiner* — Edward Park
(74) *Attorney, Agent, or Firm* — Tutunjian & Bitetto, P.C.

(57) ABSTRACT

The invention relates to a method for processing a video sequence formed by at least two video images, said method comprising:
obtaining said at least two video images using a first capture module with a first field of view, each video image representing a same scene captured at different instants or from different points of view,
wherein said method comprises:
determining luminance information from at least one overall image obtained by a second capture module with a second field of view greater than said first field of view, said overall image representing the scene captured at different instants or from different points of view,
down-converting a dynamic range of said video images taking into account said luminance information.

20 Claims, 4 Drawing Sheets

(51) Int. Cl.
*H04N 5/235* (2006.01)
*H04N 5/243* (2006.01)

(56) References Cited

U.S. PATENT DOCUMENTS

| | | | |
|---|---|---|---|
| 2006/0056056 A1* | 3/2006 | Ahiska | G08B 13/19608 359/690 |
| 2010/0177160 A1* | 7/2010 | Tocher | G02B 13/06 348/36 |
| 2013/0038790 A1 | 2/2013 | Seetzen et al. | |
| 2013/0155330 A1 | 6/2013 | Longhurst et al. | |
| 2013/0222533 A1 | 8/2013 | Maeda | |
| 2015/0138406 A1* | 5/2015 | Sokeila | H04N 5/232 348/262 |

OTHER PUBLICATIONS

Mantiuk et al: "Display adaptive tone mapping" ACM Transactions on Graphics 27, 1; Aug. 1, 2008; pp. 1-10.
Ramsey et Al: "Adaptive temporal tone mapping" Computer Graphics & Imaging; Aug. 17, 2004; pp. 1-6.
Reinhard et al: "Photographic Tone Reproduction for Digital Images"; ACM Transactions on Graphics, 21, Jul. 1, 2002; pp. 267-276.
Search Report Dated Sep. 4, 2014.
Boitard et al., "Temporal Coherency for Video Tone Mapping", Applications of Digital Image Processing XXXV, SPIE vol. 8499, San Diego, California, USA, Aug. 12, 2012, pp. 1-10.
Srinivasan et al., "Qualitative Estimation of Camera Motion Parameters From Video Sequences", Pattern Recognition, vol. 30, No. 4, 1997, pp. 593-506.

* cited by examiner

METHOD FOR PROCESSING A VIDEO SEQUENCE, CORRESPONDING DEVICE, COMPUTER PROGRAM AND NON-TRANSITORY COMPUTER-READABLE-MEDIUM

This application claims the benefit, under 35 U.S.C. §119 of European Patent Application No. 14305379.1, filed Mar. 18, 2014.

1. TECHNICAL FIELD

The invention relates to the general field of dynamic range conversion implemented in image processing.

By definition the dynamic range is the ratio between the largest and smallest possible value of the changeable quantity corresponding to the luminance, which is a photometric measure of the luminous intensity per unit area of light travelling in a given direction (luminance being expressed in $cd/m^2$).

More specifically, the invention can be applied for reducing the dynamic range of an image or of a sequence of images (said images being also called "frames"). In other words, the invention can be applied for changing the luminance values of the pixels of said image (or of the pixels of each image of the sequence of images), which belongs to a predetermined original dynamic range to obtain luminance values which belong to a dynamic range lower than the predetermined original dynamic range.

The invention finds particular application in image processing for photography or Video application, and more particularly the restitution of High Dynamic Range images (HDR), which can represent more accurately the range of intensity levels found in real scenes.

2. BACKGROUND ART

2.1 Introduction

The human sense of sight has a very high dynamic range. A human can indeed see objects in starlight (although colour differentiation is reduced at low light levels) or in bright sunlight, even though on a moonless night objects receive $1/1,000,000,000$ of the illumination they would on a bright sunny day: that is a dynamic range of 30 f-stops.

In practice, it is difficult to achieve the full dynamic range experienced by humans using electronic equipment. Namely, the display capabilities of print-outs, LCD monitors, or projectors have a limited dynamic range (or low dynamic range LDR) that is inadequate to reproduce the full range of light intensities present in natural scenes.

High-dynamic-range (HDR) digital video solutions had been developed for representing more accurately the range of intensity levels found in real scenes. HDR images can capture more information than can be displayed on a conventional screen characterized by a low dynamic range (LDR), and are often captured by way of a plurality of differently exposed pictures of the same subject matter.

In other words, non-HDR (or LDR) cameras take photographs with a limited exposure range, resulting in the loss of detail in bright or dark areas. HDR compensates for this loss of detail by capturing multiple photographs at different exposure levels and combining them to produce a photograph representative of a broader tonal range.

In addition, over the last decades, algorithms have been developed to map the image differently in shadow and in highlight in order to better distribute the lighting range across the image. These techniques are known as tone mapping and permit to convert High Dynamic Range images (HDR) or HDR video sequence, to low Dynamic Range (LDR) images or LDR video sequence.

2.2 Tone Mapping Operators

Such a tone mapping relies first on Tone Mapping Operators (TMOs) for modifying the dynamic of a source image captured using an HDR capture module to obtain a resulting image with a lower dynamic range so that such resulting image presents a dynamic adapted to be displayed on an LCD monitor.

In the following, "modifying the dynamic of an image" corresponds to convert, adapt or modify the luminance component (i.e. the luminance component values) of the image.

If the source image, once its dynamic range has been modified, is dedicated to a display system, the luminance component is quantified and encoded so that to be compatible with a display standard (e. g. BT 709, etc.). In this case, it is not referred to the "luminance" component but usually to the "luma" component.

Thus, the tone mapping techniques are just as much applicable to a luminance component than to a luma component.

Among the known tone mapping operators (TMOs), also called Tone reproducers, the PTR tone mapping operator, described in details by E. REINHARD et al. ("*Photographic tone reproduction for digital images*"), ACM transactions on Graphics, 21, 267-276 (July 2002) can be cited.

Applying TMO "naively" to each frame of an HDR video sequence leads to temporal artefacts. For dealing with flickering artefacts, other tone mapping operators are based on the use of a key depending on the pixels of the current image, whose dynamic range has to be converted, and on a predetermined number of pixels of the image preceding the current image in the sequence of images, as described by KANG S. B. et al. ("*High dynamic range video*"), ACM transactions on Graphics, Proceeding of ACM SIGGRAPH, volume 22, Issue 33, July 2003 pages 319-325.

There are also known tone mapping operators, who use a number of previous images of the video sequence, which is dynamically adapted according to the key of the current image and the keys of previous images as described by RAMSEY S. et al. ("*Adaptive temporal tone mapping*"), Computer Graphics and Imaging—2004 (3), 3-7 (2004).

Other tone mapping operators compare an original image with a visual response of the human visual system (HVS) to an image whose luminance values belong to a dynamic range adapted to a screen as described by MANTIUK R., ("*Display adaptive tone mapping*"), ACM Transactions on Graphics 27, 1 (August 2008), which provides an image with the least distorted possible visual perception on the screen.

To deal with temporal artefacts, the above solutions use temporally close images of the video sequence to smooth out abrupt changes of luminance. However, longer time ranges introduce temporal brightness incoherency, the brightness being coherent in a tone mapped content when the relative brightness between two zones of the HDR video sequence is preserved during the tone mapping (both in the spatial and the temporal domain). But, as a TMO uses independently for each image (or frame) all the available display ranges, the HDR brightness coherency is not preserved throughout the tone mapping operation. Consequently, areas perceived as the brightest in the HDR sequence are not necessarily the brightest in the LDR one.

2.3 Tone Mapping Post-Processing

To preserve the brightness coherency between the tone mapped resulting images, a Brightness Coherency technique (called BC technique), has been proposed by one of the inventors BOITARD R. et al. ("*Temporal coherency for video tone mapping*"), in Proc. SPIE Conference Series, volume 8499 of SPIE Conference Series, 2012).

Such a technique relies on an indication of the overall brightness of each image (or frame) of a video sequence. By using the brightness image in the HDR video sequence (i.e. the frame with highest indication of overall brightness) as an anchor, each other tone mapped images are scaled down relative to this anchor.

As each image is processed relative to the anchor, the temporal brightness coherency is preserved even between non-adjacent images.

One drawback of this technique is that it deals only with the overall brightness without solving local brightness coherency. To solve this aspect, a Zonal Brightness Coherency (called ZBC technique) has been proposed by the inventor BOITARD R. et al. ("*Zonal Brightness Coherency for video tone mapping*"), Signal Processing: Image Communication (available online 16 Oct. 2013, http://dx;doi.org/10.106/j.image.2013.10.001).

More precisely, according to this technique, each image is divided into segments using a histogram-based segmentation of HDR images. Then, video zones thanks to the resulting image's segments are defined, and the Brightness Coherency (BC) technique is applied to each video zone independently.

Such Zonal Brightness Coherency (ZBC) technique preserves both the temporal brightness coherency and the spatial contrast in each image.

2.4 Drawbacks of the Prior Art Technique

The TMO's operators of the prior art is applied on each image of the video sequence independently, leading to temporal artefacts comprising temporal brightness incoherency, and the brightness coherency techniques require information coming from other video sequence images than from the current image.

In addition, in some cases relating to dynamic range conversion, all the other images of the video sequence are required to obtain an efficient result. In other words, once all the images belonging to the video sequence are captured, a post-processing can be implemented to find the more relevant luminance information for an optimal dynamic range conversion.

However, such requirements are not achievable when considering a real-time network broadcasting, where, at an instant t, information located in "future images" is not known.

Indeed, the use of a temporal buffer leads to a processing period, which is incompatible with real-time constraints. Thus, the methods of the prior art, using or not the brightness coherency techniques, do not permit to preserve the temporal coherency when a real-time broadcast is implemented.

3. SUMMARY OF INVENTION

The invention proposes a new solution as a method for processing a video sequence, said method comprising a step of obtaining at least one image using a first capture module, said at least one image representing a scene with a first capture angle, said at least one image being called video image.

According to the invention, said method comprises also the following steps:

obtaining, by using a second capture module different from said first capture module, metadata corresponding to at least one image representing said scene with a second capture angle strictly greater than said first capture angle, said at least one image being called overall image, said overall image comprising said video image, determining luminance information from said metadata corresponding to said overall image, conversion of a dynamic range of said video image taking into account of said luminance information.

The processing of a video sequence according to the invention is therefore based on the consideration of a luminance information determined from an image, which does not belong to the video sequence and which is captured by a separate capture module from the one used for capturing the images of the video sequence.

Indeed, such a processing of a video sequence permits to enlarge the capture angle of luminance information regarding the capture angle of the capture module used for capturing the video images of the video sequence.

By luminance information, it is considered a piece of information corresponding to a luminance, or to a luma value (corresponding to a luminance component, which is quantified and encoded so that to be compatible with a display standard).

For example, such luminance information is the maximum value of the luminance of a point (or of zones) of the scene located outside of some of the frames of the video sequence, like the maximum value of the luminance provided by the sun illuminating a football game, whereas the video camera is only focused on the playground, never looking at the sky.

Thus, it is possible that the field of the video image captured at a considered instant t does not comprise the point of the scene with the maximum luminance value, and advantageously, such a knowledge of the maximum value is provided according to the present invention by a second image captured with a greater capture angle using a distinct capture module.

For example, the first capture module is a classical digital movie camera, for example made by Sony®, JVC®, Canon®, or GoPro®, with a predetermined frame rate (in fps frame per second). Movies on film are almost exclusively projected at 24 fps. Television, however, does not have an internationally accepted frame rate. In Europe and many other countries, PAL and SECAM use 25 fps, whereas NTSC video in North America and Japan uses 29.97 fps. Other common frame rates are usually multiples of these. Advantageously, some digital video formats support several frame rates within a single format, allowing variable frame rate video recording and film (24 fps) compatibility.

The second capture module is for example a camera system able to create automatically and quickly panoramic or full spherical image (360°×180°) images with high resolution and optionally high dynamic range (HDR). Such a second capture module corresponds for example to a LizardQ®, a SceneCam®, or a Panoscan's MK-3® camera with a rate of one overall image (corresponding to a panoramic image) every 5 seconds or one overall image per second.

Thus, the conversion of a dynamic range of the video image is not implemented, as in the prior art, by taking into account only the known luminance information related to the sequence video, but by taking into account an external luminance information related to the metadata representing overall scene captured by the second capture module.

Consequently, such an external luminance information permits to detect easily and in real time the most relevant luminance information of the overall image captured by the video capture module (e. g. a camera) for applying, in real time, a conversion of the dynamic range of each image of the video sequence.

Thus, for a video image captured at an instant t, using such an external luminance information from an image representing the overall scene permits to know in advance the maximum luminance value that could appear later in the video sequence.

Consequently, the method according to the invention permits to reduce in real time the dynamic range while conserving the temporal coherency of the whole video sequence. One can make profits of such an advantage by applying the method according to the invention for real-time broadcasting low dynamic range content when the acquisition was made with a camera whose dynamic range is higher than the one of the content to broadcast.

In addition, since such luminance information corresponds to a real luminance information of the scene, the dynamic range conversion is not implemented arbitrary or globally, but optimally, using only a natural luminance information which really exists in the captured scene.

According to a particular aspect of the disclosure, said step of determining luminance information from said overall image comprises a prior step of determining the location of said video image into said overall image.

Such a determining of the location of the video image within the overall image permits indeed to locate the position of the first capture module regarding the position of the second capture module. In other words, such a prior step permits to detect the common parts between the video image and the overall image, and consequently to detect the parts of the overall image which are located outside the considered video image.

Thus, such a prior step of determining the location of the considered video image inside the overall image (corresponding for example to a panorama image) permits to obtain a spatial synchronisation between these two images.

Such parts located outside the considered video image are particularly useful since they contain luminance information of the scene, which is not available starting only from the video image considered at an instant t or starting from the previous video images of the video sequence.

According to variants of this embodiment, the step of determining the location of the considered video image inside the overall image can be implemented using known techniques, which implements for example the following steps showing correspondence areas between the video image captured by the first capture module and the overall image captured by the second capture module:
  extraction of interest points (called also "key points") of the video image,
  extraction of the same interest points of the video image in the overall image, and obtaining the local image descriptors of these interest points,
  comparison of descriptors associated respectively to the video image and to the example image to obtain couples of interest points with similar descriptors, where a decision threshold can be implemented to provide a number of "good" couples,
  determining a deformation model (homographic or otherwise) for matching the points of interest of the video image with the points of interest of the overall image (i.e. for transforming the video image into the overall image by moving the points of the couples as previously obtained from their starting positions to their arrival positions),
  applying the deformation model to the video image to obtain a distorted (or warped) video image (i.e. aligned), which is geometrically similar to the overall image.

For the key points extraction, which can be also called key point detection, several known techniques can be used such as: The Harris & Stephens/Plessey/Shi-Tomasi corner detection algorithm, the Features from accelerated segment test (FAST) technique, the Scale-invariant feature transform (SIFT), the Speeded Up Robust Features (SURF) technique, the Binary Robust Invariant Scalable Key points (BRISK) . . . .

For the descriptors extraction and for matching the points of interest, the above SIFT and BRISK techniques can be for example implemented, or another technique like the Binary Robust Independent Elementary Features technique (BRIEF).

According to a particular variant of this embodiment, said step of determining the location of said video image into said overall image is performed by determining a distortion metrics.

For example, such a distortion metrics could be performed starting from different pixel features of the two images like motion, color, texture, luminance, etc, using known image distortion algorithms.

According to a particular aspect of this variant, said distortion metrics corresponds to the following sum of absolute difference:

$$Dist_{dx,dy} = \sum_{x=0}^{N-1} \sum_{y=0}^{M-1} \sqrt{(C(x,y) - S(x+dx, y+dy))^2}$$

where C represents a value of a predetermined metadata of said video image, S represents a value of said predetermined metadata of said overall image of height N and width M, (x, y) the coordinates of a starting point of said video image and (dx, dy) the coordinates of a tested location of said video image in said overall image,
said location corresponding to a point of said overall image, whose coordinates correspond to a couple (dx, dy) minimizing the distortion $Dist_{dx,dy}$.

As already said above, the values C and S could correspond to another feature of the pixel such as the color, a spatial and/or temporal frequency subband.

In other words, the resulting point of said overall image whose coordinates correspond to a couple (dx, dy) minimizing the distortion $Dist_{dx,dy}$ corresponds to the position of the point of coordinates (x, y) in the video image, for example the first left-bottom pixel of the video image (of coordinates (0,0) in the video image) regarding the first left-bottom pixel of the overall image (of coordinates (0,0) in the overall image).

According to another special aspect of this variant, said distortion metrics is determined at least two times by applying each time a different scaling to both said video image and said overall image. Such aspect permits to solve the problem that arises when the considered video image and the overall image present different resolutions.

Thus, if a scaling s is considered the triplet (dx, dy, s) minimizing the distortion permits to detect the location of said video image within the overall image.

According to another particular aspect of this variant, said step of determining the location of said video image into said overall image implements previously the following steps for said video image or for said overall image:
- a calibration step delivering a function between at least one code value of said video image and at least one physical value, or delivering a function between at least one code value of said overall image and at least one physical value,
- an inverting step of said function delivering physical values of said video image or of said overall image.

Such aspect is implemented in particular when the video image and the overall image differ by their dynamic range, one being for example in High Dynamic Range whereas the other is in low Dynamic Range (LDR) images.

Indeed, as HDR values represent physical absolute value, expanding the dynamic range of one or both the considered video image and the overall image to achieve HDR values ensure that they can be compared afterwards.

To recover the physical value of one the video or overall image, one can calibrate the first and/or second capture module.

As disclosed by MANN S. et al. (*"On being "Undigital" With Digital Cameras: Extending dynamic Range by combining Differently Exposed Pictures"*), in Proceedings of IS&T 46$^{th}$ annual conference (May 1995), pp 422-428, calibration consists in measuring the Camera Response Function (CRF). Once the CRF is known, it is possible to invert the non-linear transformation applied inside one of the capture module and to obtain the physical values, and in particular the luminance, of the image.

According to another aspect of the present disclosure, said step of determining the location of said video image into said overall image comprises a cropping step of said overall image.

Indeed, advantageously, once the location of the video image is known in the overall image, it is possible to size the overall image, so that the area used for determining the luminance information is reduced.

Thus, the following step of determining the luminance information is optimized, its implementation being less time consuming.

Optionally, said cropping step could take into account the result of the preceding cropping step(s) implemented for processing the image(s) (or frames), which precede(s) the current considered frame.

Thus, the reduction of the area used for determining the luminance information would be optimized (in other words, increased), regarding the cropped overall image used for the preceding video images.

According to a first variant of this aspect of the present disclosure, said cropping step comprises a step of motion prediction of said first capture module.

Regarding this aspect, the overall image is reduced taking into account the motion of the first capture module, for example a camera. Consequently, the motion prediction helps to optimize the cropping of the overall image by focusing it on the complete trajectory of the first capture module.

Thus, for a current video image, if the relevant luminance information required for a good conversion of the dynamic range of the video sequence comes from one of the following images of the video sequence (which does not permit a real-time conversion of the dynamic range according to the methods of the prior art), the present invention permits to achieve a real-time conversion since such information can be found in real-time in the cropped overall image taking into account the trajectory of the camera during the capture of the video sequence.

In addition, taking into account the result of the preceding cropping step(s) implemented for processing the image(s) (or frames), which precede(s) the current considered frame, could also helps to reduce the time of the motion prediction step of said capture module.

According to another variant, combined or not with the previous one, said cropping step comprises a step of determining of an image capture degree of freedom of said first capture module.

Such aspect concern the case, where the video shooting motion implemented by the first capture module is "limited" by nature regarding the captured topic, for example a sport game where all the images of the video sequence will be captured in a space, which is obviously inferior than a full sphere.

Thus, it is not necessary to use the whole overall image delivered by the second capture module, for example a spherical image (360°×180°), but a cropped overall image corresponding to a "half spherical image" centred on the location of the video image.

According to another variant, combined or not with the previous ones, said cropping step takes into account of metadata entered by a user.

For example, said metadata being entered previously to the step of obtaining said metadata corresponding to said overall image, or being entered by the user when implementing the cropping step.

Such variant permits to set the parameters of the second capture module delivering the overall image. Thus, the overall image and the corresponding metadata which are delivered by the second capture module, whose parameters have been previously defined by the user, usually called the Director of Photography, correspond directly and respectively to an optimised overall image comprising only the metadata that are useful for the following determining luminance information.

In other words, the metadata or the image delivered by the second capture module adjusted previously by the user is directly and optimally cropped according to the needs of the user.

According to an embodiment, said step of conversion of a dynamic range of said video image implements a step of computing a tone mapping operator using said luminance information.

Thus, according to this embodiment the classical Tone Mapping Operator is directly modified in order to take into account the most relevant luminance information of the global scene.

According to an other embodiment, said step of conversion of a dynamic range of said video image taking into account of said luminance information implements the following steps:
- a tone mapping of said video image delivering at least one tone mapped image,
- a zonal brightness coherency analysis taking into account of said luminance information, delivering anchor zones of said overall image, and the following successive steps:
- a modification of said at least one tone mapped image of said video image using said anchor zones of said overall images, delivering at least one modified tone mapped image,
- a tonal level redistribution of said video image using said modified tone mapped image,
- a conversion of floating point values of said video image to integer code values.

In other words, while in the prior art the Zonal Brightness Coherency (ZBC) is applied only on the video images, according to the present disclosure this is the overall or the cropped overall image which is divided into segments or video zone using a histogram-based segmentation and the Brightness Coherency (BC) technique is applied to each video zone independently.

Such Zonal Brightness Coherency (ZBC) technique, is applied after the classical tone mapping (i.e. the TMO is not modified) and preserves in real time both the temporal brightness coherency and the spatial contrast in each video image of video sequence by taking into account luminance information delivered by a capture module distinct from the one used for capturing the video sequence.

Another aspect of the disclosure concerns a device for processing a video sequence, said device comprising a first capture module being able of obtaining at least one image, said at least one image representing a scene with a first capture angle, said at least one image being called video image, wherein said device comprises also:
- a second capture module, said second capture module being different from said first capture module, and being able of obtaining metadata corresponding to at least one image representing said scene with a second capture angle strictly greater than said first capture angle, said at least one image being called overall image, said overall image comprising said video image,
- a determining module for determining luminance information from said metadata corresponding to said overall image,
- a conversion module for converting a dynamic range of said video image taking into account of said luminance information.

Such a device for processing a video sequence is particularly adapted to implement the method for processing a video sequence as described above.

According to particular aspect of said device, said first capture module and said second capture module have different capture frequencies for obtaining respectively said video image and said overall image.

For example, on the one hand, the first capture module is a classical digital movie camera, for example made by Sony®, JVC®, Canon®, or GoPro®, with a predetermined frame rate corresponding for example according to the PAL and SECAM standards to 25 fps (frame per second).

On the other hand, the second capture module corresponds for example to a LizardQ®, a SceneCam®, or a Panoscan's MK-3® camera with a rate of one overall image (corresponding to a panoramic image) every 5 seconds or one overall image per second.

In other words, if a first capture module with a frame rate of 25 fps, and a second capture module, with a frame rate equal to one overall image every five seconds, are used a same overall image is used for processing 125 successive video images of the video sequence.

Imposing a frame rate of the second capture module such that one overall image is captured every 5 seconds permits to take into account the temporal evolution of the luminance, for example linked to the sunset time where the brightness changes rapidly.

Such a frame rate of the second capture module permits thus to enhance the realistic perception of the video sequence whose dynamic range is converted according to the present invention.

Of course, this device will comprise the different features relating to the method for processing a video image according to the invention, which have been previously described and, which can be taken together or separately. Thus, the features and advantages of this device are the same as those of the method for processing a video sequence. Therefore, they are not described in more detail.

The disclosure further relates to a computer program product downloadable from a communication network and/or recorded on a medium readable by computer and/or executable by a processor, comprising program code instructions for implementing the steps of the method for processing a video sequence according to the present disclosure.

The disclosure also relates to a non-transitory computer-readable medium comprising a computer program product recorded thereon and capable of being run by a processor, including program code instructions for implementing said method for processing a video sequence according to the present disclosure.

Although examples of the invention have been described hereinabove in relation with a limited number of embodiments, those skilled in the art, when reading this description, will understand that other embodiments can be imagined without leaving the scope of this invention.

In particular, while not explicitly described, the present embodiments may be employed in any combination or sub-combination.

As will be appreciated by one skilled in the art, aspects of the present principles can be embodied as a device, method or computer readable medium. Accordingly, aspects of the present principles can take the form of an entirely hardware embodiment, an entirely software embodiment (including firmware, resident software, micro-code, and so forth), or an embodiment combining software and hardware aspects than can all generally be referred herein as a "circuit", "module", or "device". Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

Moreover, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable storage media and so executed by a computer or processor, whether or not such computer or processor is explicitly shown.

1. BRIEF DESCRIPTION OF DRAWINGS

Other characteristics and advantages of embodiments of the invention shall appear when reading the following description, provided by way of a non-restricted and indicative example (all of the embodiments of the invention are not limited to the characteristics and advantages of the embodiments described hereinafter), and the annexed drawings, wherein.

2. DESCRIPTION OF EMBODIMENTS

5.1 General Principle

The invention, according to its different embodiments, is first based on luminance information, required for a real time dynamic range conversion of a video sequence, and determined from an overall image delivered by a capture module distinct from the one used for capturing each video image.

Thus, at an instant t the luminance information required for a good dynamic range conversion of a current video image is provided by a capture module able to capture the metadata corresponding to an overall image with a capture angle greater than the capture angle used by the capture module, which captures each video image.

Such overall image contains indeed in real time the relevant luminance information, which would be determined according to the prior art only by post-processing the whole video sequence and once all the images (or frames) of the video sequence would be known.

Consequently, the present invention permits a real-time broadcasting and avoids the post processing according to the prior art.

Figure 1A:
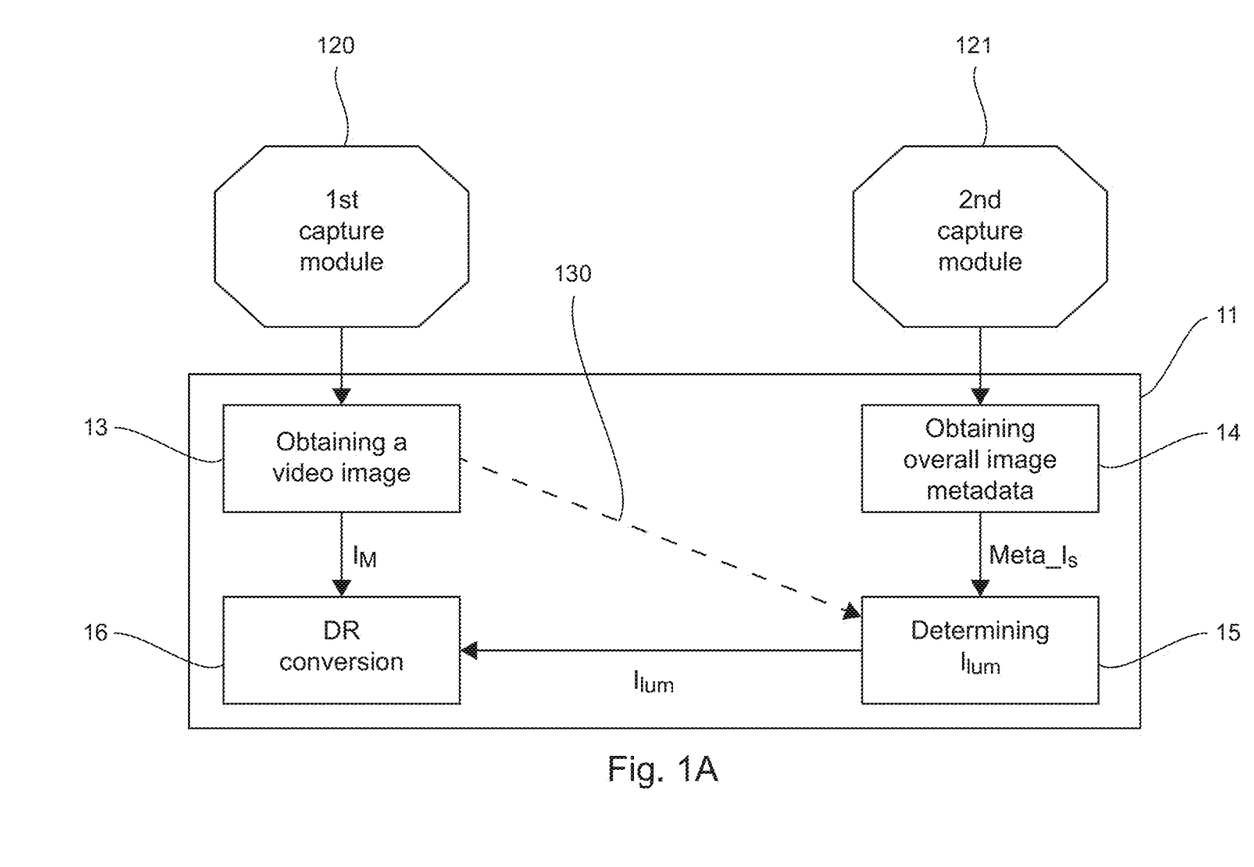
FIGS. 1A and 1B illustrate respectively the steps implemented according to the general principle of the present technique and the corresponding video images and overall image.

In relation with FIGS. 1A and 1B, the main steps of the method for processing a video sequence are detailed in the following.

First, a video image $I_M$, also called a frame, is obtained (13) by using a first capture module (120), for example a high digital range camera delivering a HDR video image. This video image comprises physical luminance values (expressed in cd/m$^2$) recorded by said HDR camera at an instant t from a whole scene, which is currently filmed.

In parallel, or previously, metadata Meta_$I_s$ of a distinct overall image $I_s$ from the video image $I_M$ are delivered by a second capture module (121), which is able to deliver a representation of the whole scene, of which the different video frames $I_{Mi}$ (with 1≤i≤N with N the number of frames of the video sequence), give different points of view of said scene.

Said second capture module (121) is a sensor corresponding for example to a LizardQ®, a SceneCam®, or a Panoscan's MK3®. Considering the case of the LizardQ®, said sensor implements the combination of multiple frame fisheye shots of 22 MegaPixel each, captured from 5+1 different directions.

Such a second capture module is characterized also by a capture time ranging from 15 seconds to 1 minute, uses for example a Canon EOS 5D Mark III sensor with several exposure to capture up to 30 f-stops and enables long based exposure of up to 30 seconds for night capturing for example.

The metadata Meta_$I_s$ and/or the representation delivered by said second capture module (121) can be of any resolution, bit depth (LDR 8-bits or HDR) and only the luma can be provided (indeed, the color channel is not required by the method according to the invention).

Figure 1B:
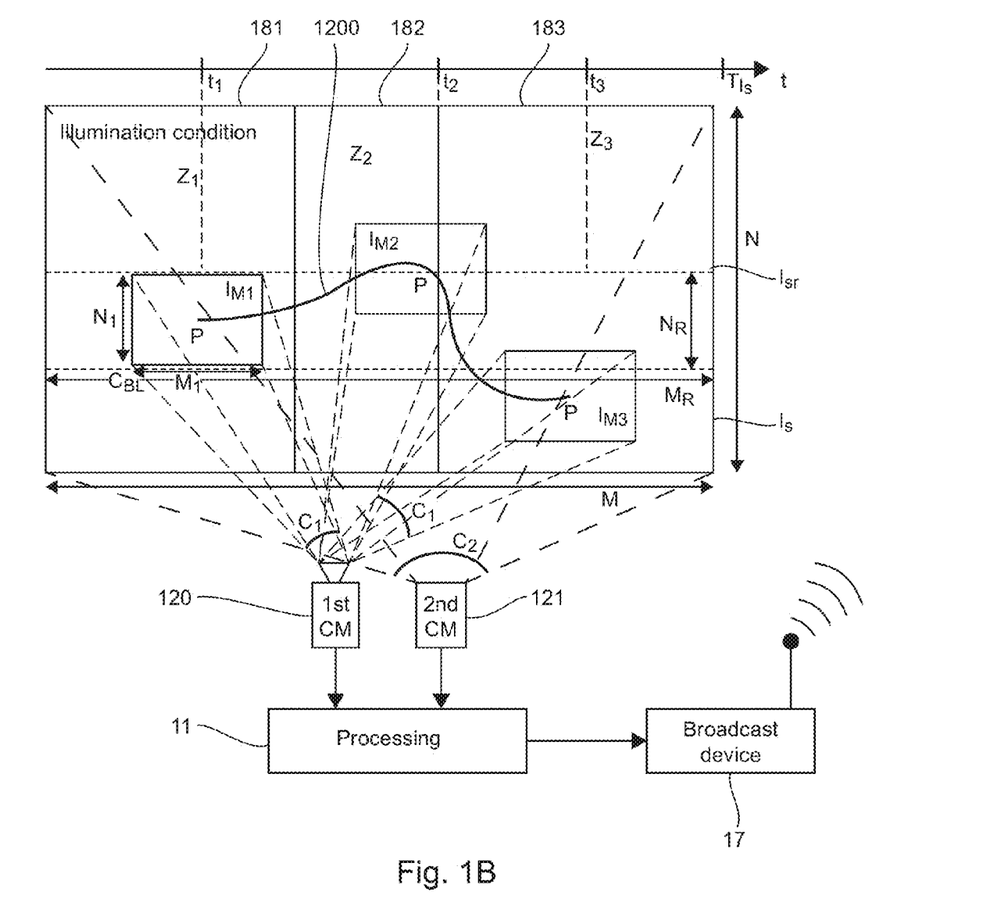

As illustrated by FIG. 1B, such an overall image $I_s$ is delivered by the second capture $2^{nd}$_CM module, which implements a capture angle C2 strictly greater than the capture angle C1 implemented by the first capture module $1^{st}$_CM, which delivers the video images of the video sequence. Considering such a difference of capture angles (fields of view) (C1 and C2) between the first and the second capture module, the overall image delivered by the second capture module (121) is a representation of the scene, for example a panorama or a full spherical representation, whose size is strictly greater than the video images of the video sequence.

It can be noted that said first capture module $1^{st}$_CM and said second capture module $2^{nd}$_CM are closely located or superposed within a single device.

It could also be considered that said first capture module $1^{st}$_CM and said second capture module $2^{nd}$_CM would be separated by a distance not permitting to embed them in a same housing. In this case, the device according to the invention would correspond to a distributed system.

In addition, said first capture module and said second capture module have different capture frequencies for obtaining respectively said video images $I_{Mi}$ and said overall image $I_s$.

For example, the first capture module implements a predetermined frame rate of 25 fps (frame per second), whereas the second capture module captures one overall image (corresponding to a panoramic image) every 5 seconds or one overall image per second.

In other words, if a first capture module with a frame rate of 25 fps, and a second capture module, with a frame rate equal to one overall image every five seconds, are used a same overall image $I_s$ is used for processing 125 successive video images of the video sequence.

More precisely, as can be seen on FIG. 1B, the different video images $I_{M1}$, $I_{M2}$ and $I_{M3}$ are captured at different instants $t_1$, $t_2$ and $t_3$, depending for example on the motion (represented by a curve 1200) of an object represented by a pixel p, and are located in different zones of the whole scene as represented by the overall image $I_s$ which is used during a period $T_1$, comprising at least the different instants $t_1$, $t_2$ and $t_3$. As can be seen, every video image $I_{M1}$, $I_{M2}$ and $I_{M3}$ is comprised into said overall image $I_s$.

As illustrated by FIG. 1B, it is possible that such different frames of video sequence are located in, or overlap, different luminance zones $Z_1$, $Z_2$ and $Z_3$ of the whole scene as represented by the overall image $I_s$.

Each zone corresponds to a set of pixels, where the luminance value of each pixel belonging to said zone is comprised between two luminance threshold values $L_{10}$ and $L_{11}$ for luminance zone $Z_1$, $L_{20}$ and $L_{21}$ for luminance zone $Z_2$, $L_{30}$ and $L_{31}$ for luminance zone $Z_3$ for example.

It can be noted that on FIG. 1B such zones correspond to adjoining bands of different width, but such zones could be spatially separated with different forms like square, circle or part of circle (e.g the sun, the moon), etc.

It can be noted that such zones are really larger than the video images $I_{M1}$, $I_{M2}$ and $I_{M3}$ delivered by the first capture module. Thus, the luminance information used for defining such luminance zones in the overall scene can be unknown starting only from the video images as it is done in the prior art.

In other words, in such an overall image of the whole scene it is possible that the source of maximum light, e. g. the sun, is located on the left and out of the image $I_{M1}$.

Once the video image and the metadata Meta_$I_s$ of said overall image $I_s$, are obtained it is possible to determine (15) luminance information $I_{lum}$ from said metadata Meta_$I_s$ corresponding to said overall image. Said luminance information corresponds for example to the relevant luminance information $I_{lum}$ that could appear in the following images of the video sequence after a motion of the camera.

For example at an instant $t_1$, it is possible that the relevant luminance information $I_{lum}$, permitting to keep a temporal coherency and thus required for a good dynamic range conversion is belonging to the following image $I_{M3}$ captured at $t_3>t_1$.

Thus, the determining step of the present invention is able to find such a relevant luminance information at the instant $t_1$, since it is known at the same instant $t_1$ thanks to the metadata Meta_$I_s$ of said overall image $I_s$.

According to a first aspect, it is possible that such luminance information corresponds to the maximum luminance that can be detected in the overall image representing the whole scene captured by all the frames of the video sequence.

Thus, such step of determining luminance information implements the detection of the maximum luminance among the metadata provided by the second capture module.

In other words, according to this variant, $I_{lum}$ would be directly a luminance value and the following dynamic range (DR) conversion (16) of the video image $I_{M1}$ would consist in insuring the temporal coherency, in other words, all the luminance values of the video image $I_{M1}$ would have to be lower that the maximum luminance $I_{lum}$ delivered by said step of determining (15).

5.2 Description of a First Embodiment of the Method for Processing a Video Sequence According to a first embodiment, the following dynamic range (DR) conversion (16) would consist in taking into account $I_{lum}$ for the computation of the Tone Mapping Operator. In other words the TMO operator is modified using luminance information $I_{lum}$ from said metadata Meta_$I_s$ corresponding to said overall image.

For example, considering the PTR tone mapping operator, described in details by E. REINHARD, whose principle is to modify the luminance component $L_w$ of the video image to obtain a modified luminance component $L_d$ by using a mapping curve of sigmoid type given by the following equation:

$$L_d = \frac{L_s}{1+L_s} \cdot \left(1 + \frac{L_s}{L_{white}^2}\right), \quad (1)$$

with $L_{white}$ a luminance value, for clipping areas of said video image $I_{M1}$ with high luminance values, $L_d$ a matrix whose size is the one of the video image $I_{M1}$ and which comprises the luminance values of the pixels of said image $I_{M1}$ which are expressed in a dynamic range of dynamic values lower than the original range of dynamic values of the video image $I_{M1}$, and $L_S$ a matrix whose size is the is the one of the video image $I_{M1}$, and which comprises the luminance values:

$$L_s = \frac{a}{k} \cdot L_W \quad (2)$$

with $\alpha$ a selected exposure value, k corresponding to the luminance information $I_{lum}$ according to a first embodiment of the present invention, usually called a key, which is extracted from said metadata Meta_$I_s$ corresponding to said overall image and which defines a brightness indication on said video image $I_{M1}$:

$$k = \exp\left(\frac{1}{B} \cdot \sum_{u=1}^{B} \log(\delta + L_W(u))\right), \quad (3)$$

with B the number of pixels of said video image $I_{M1}$, $\delta$ a value for avoiding singularity and $L_W(u)$ the luminance value of a pixel u of the luminance component of the video image $I_{M1}$.

According to an other aspect and depending on the selected tone mapping technique, luminance information $I_{lum}$ corresponds to a group of metadata comprising the most relevant luminance information for converting the dynamic range of the video, such a group of metadata corresponding to a reduced zone of the overall image.

Such most relevant information can be the maximum luminance value of the scene, or preferentially, said most relevant information is obtained by sorting the luminance values of the scene in ascending order and by retaining as luminance information $I_{lum}$ the value corresponding to the $99^{th}$ percentile.

Thus, regarding this aspect the dynamic range (DR) conversion (16) would consist in analysing such a group of metadata according to predetermined criteria (set by default, entered by the user, or involved by implementing a method of the prior art after implementing successive substeps according to a first embodiment of said invention), for deriving the most relevant luminance value, which has to be used as the luminance reference for obtaining a resulting dynamic range reduction, said luminance value not always corresponding to a maximum luminance of said overall image or of a part of said overall image.

Indeed, some artistic effects aim at "burning" areas in order to maintain the dynamic of some parts of the image where information is more important. As an illustration, the values corresponding to the sun are ignored because the goal of the scenario of the video sequence is not to well represent the sun. The sun will be thus "burnt" to well represent the rest of the scene.

Figure 2:
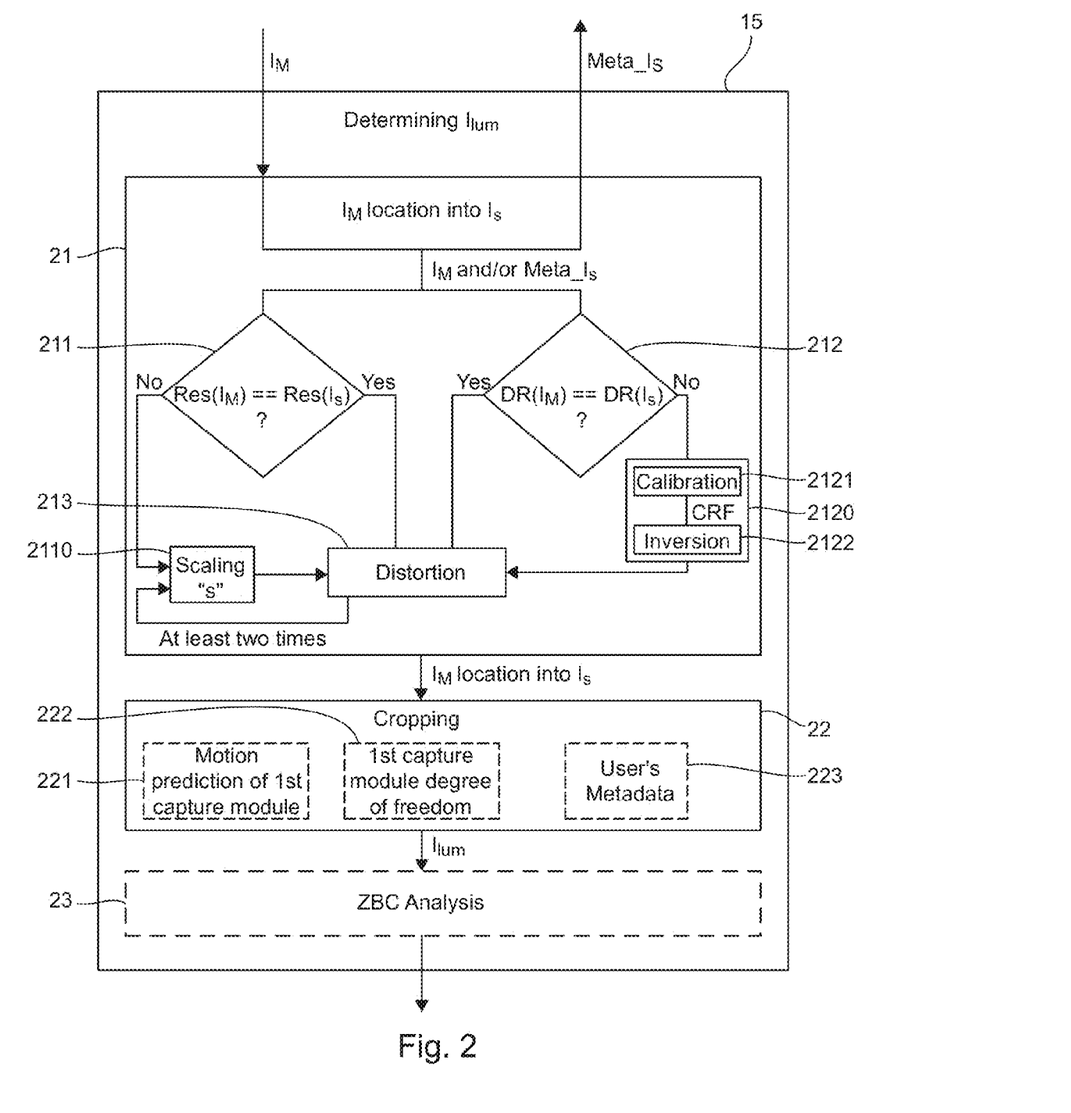
FIG. 2 illustrates a first embodiment of the present technique.

The substeps of such determining step of luminance information $I_{lum}$ (15) are more detailed in the following regarding the first embodiment of the present invention as illustrated by FIG. 2.

In any cases, the dynamic range (DR) conversion (16) according to the present invention permits the conversion of HDR video images in LDR video images, while keeping a temporal coherency between said video images, in order to permit a real-time broadcasting by a broadcast device (17) dealing with LDR video frames.

5.3 Description of a Second Embodiment of the Method for Processing a Video

Figure 3:
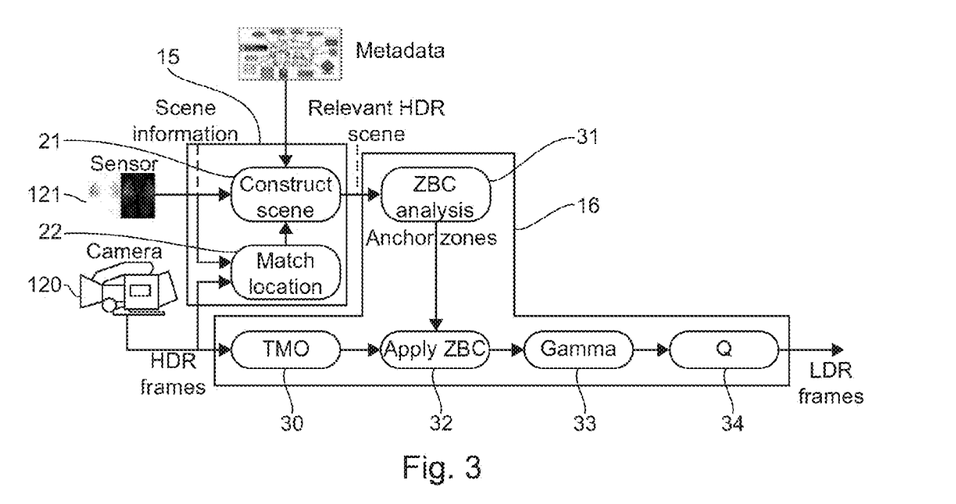
FIG. 3 illustrates a second embodiment of the present technique.

In relation with FIG. 3, a second embodiment is described, where the real-time DR conversion (16) of each video image implements the Brightness Coherency (bc) technique and more advantageously the Zonal Brightness Coherency (ZBC) technique of the prior art.

In this particular case, the step of determining (15) luminance information $I_{lum}$ delivers a luminance information $I_{lum}$, corresponding to the relevant area of the overall image $I_s$, at the input of a ZBC analysis.

As illustrated by FIG. 3, such a second embodiment would implement on the one hand a tone mapping (30) of said video image $I_{M1}$ delivering at least one tone mapped image, and on the other hand a brightness coherency or more advantageously a zonal brightness coherency analysis (31) taking into account of said luminance information $I_{lum}$, delivering anchor zones of said overall image.

According to this second embodiment, the luminance information $I_{lum}$ extracted from the overall image $I_s$ is thus not used to modify the tone mapping operator (as implemented according to the first embodiment), but at the input of the ZBC analysis post-processing applied on a tone mapped image obtained using a classical TMO operator.

Considering the real-time application of the present invention the tone mapping step applied on the considered video image and the brightness coherency analysis applied on the overall image could be implemented in parallel to save time.

More precisely, the technique developed by the inventors uses the frame key value k (see equation (2)) to preserve the HDR brightness ratio (corresponding to the HDR brightness of a frame relative to the anchor (the highest brightness of the video sequence)) in the tone mapped LDR sequence.

The HDR brightness ratio is equal to the LDR brightness ratio if:

$$\frac{k_f^{i,HDR}}{k_v^{HDR}} = \frac{k_f^{i,LDR}}{k_v^{LDR}} \quad (4)$$

where $k_f^{i,HDR}$ is the ith HDR frame (video image) key value and $k_v^{HDR}$ the highest key value of the sequence (corresponding to the brightest frame, i. e. anchor). Similarly, $k_f^{i,LDR}$ and $k_v^{HDR}$ are respectively the ith LDR frame key value and the key value of the tone mapped version of the anchor. To satisfy equation (4) the tone mapped luma $L_d^i$ of the ith frame is scaled to get the brightness coherency (BC) post-processed tone map luma $k_{BC}^i$ according to the following equation (5):

$$L_{BC}^i = \left(\zeta + (1-\zeta)\frac{k_f^{i,HDR}k_v^{LDR}}{k_v^{HDR}k_f^{i,LDR}}\right)L_d^i = s^i L_d^i \quad (5)$$

where $s^i$ represents the scale ratio of the ith frame and $\zeta$ is a user-defined parameter to avoid low scale ratio.

In the technique of the prior art as described in BOITARD et al. ("*Zonal Brightness Coherency for video tone mapping*"), to determine the anchor, i.e. the video image (also called a frame) with the maximum HDR frame key value, a video analysis is performed prior to the tone mapping operation.

Such a post-processing of all the video sequence is not possible when considering a real-time broadcasting requiring a real-time DR conversion (16) as aimed by the present invention.

Thus, the present invention proposes to avoid such a post-processing of the whole video sequence by applying the brightness coherency method to the overall image $I_s$ or to the metadata Meta_$I_s$ corresponding to the overall image $I_s$ of the scene delivered by the second capture module (121).

Thus, the key values $k_v^{HDR}$ and $k_v^{LDR}$ of equations (4) and (5) are directly obtained (31) in real-time from the overall image $I_s$.

It can be noted that the BC method as described above performs well when the brightness fluctuations in the scene change in a global way.

However, as noted in ("*Zonal Brightness Coherency for video tone mapping*"), for local fluctuations, this technique scales similarly each pixel of a frame, resulting in a lack of spatial contrast due to the reduced dynamic range.

Thus, to improve, it has been proposed to apply the BC method to zones rather than to a whole frame, which constitutes the general principal of the Zonal Brightness Coherency (ZBC) method.

According to the present invention, and advantageously, the ZBC method is applied on the overall image $I_s$ or to the metadata Meta_$I_s$ corresponding to the overall image of the scene delivered by the second capture module (121).

More precisely, a histogram-based segmentation divides the overall image $I_s$ into segments (or bands) in the luminance domain. As the segment's boundaries change from frame to frame, flickering artefacts may appear. To prevent flickering, video luminance zones based on the key values of the segment are computed like the zones $Z_1$, $Z_2$ and $Z_3$ of FIG. 1B.

According to the present invention such segmentation, implemented in the step of ZBC analysis (31), comprises the following substeps:

- compute the luminance histogram of overall image $I_s$ or starting from the metadata Meta_$I_s$ corresponding to the overall image, or starting from the reduced overall image $I_{sr}$;
- finding the local maxima in said histogram,
- removing local maxima that are too close to each other,
- finding local minima between successive local maxima,
- defining local minima as segments boundaries,
- computing the key value for each segment.

Advantageously, it can be seen that the above successive steps are implemented only one time overall image $I_s$ or starting from the metadata Meta_$I_s$ corresponding to the overall image, or starting from the reduced overall image $I_{sr}$ whereas in the prior art they have to be repeated for each video image of the video sequence which requires that all video images of the video sequence are known, and which is thus incompatible with a real-time broadcasting by a LDR device.

It can noted that according to this second embodiment the ZBC analysis step is implemented, once the steps of determining the location of the considered video image $I_{M1}$ into the overall image $I_s$ and the of cropping are implemented, and before the DR conversion which consists in modifying the TMO.

Thus, according to this second embodiment, it can be considered that such a step of ZBC analysis (23) is on the one hand optionally (in dashed line) comprised in the step of determining luminance information (15), the luminance information $I_{lum}$ corresponding in this case to anchor zones, or that this step is on the other hand included in the DR conversion step (16) as represented by FIG. 3.

Thus, when considering the device, which implements the method according to this second embodiment of the invention, the determining module for determining luminance information $I_{lum}$ can comprise means for implementing a ZBC analysis of the overall image $I_s$ according to a first variant, or according to a second variant, this the conversion module, which comprises such means for implementing a ZBC analysis of the overall image $I_s$.

In addition, according to this second embodiment, once the ZBC analysis is performed, the DR conversion comprises also the following successive steps:
- a modification (32) of said at least one tone mapped image of said video image using said anchor zones of said overall images, delivering at least one modified tone mapped image,
- a tonal level redistribution (33) of said video image using said modified mapped image,
- a conversion (34) of floating point values of said video image to integer code values corresponding for example to the used bit-depth (i.e. [0;255] for 8 bits).

5.4 Description of Different Variants of the Luminance Information $I_{lum}$ Determining Step In relation with FIG. 2, different variants of the luminance information $I_{lum}$ determining step (15) are detailed in the following. Such variants can be applied to one or the other of the two previous embodiments. Such variants aims at reducing the field for detecting relevant luminance information starting from the metadata of the overall image delivered by said second capture module.

In addition, such variants aim at solving the problems related with the fact that the considered video image $I_{M1}$ and the overall image $I_s$ do not always present corresponding resolution or do not present always the corresponding dynamic range.

It can be noted that according to the present invention, "corresponding resolution" does not imply a same resolution of said video image $I_{M1}$ and said overall image $I_s$. Indeed, as the quantity of information represented in both images is different, "corresponding resolution" means that for the same object represented in the two pictures, the same number of pixels will be needed to depict it.

To find most relevant luminance information $I_{lum}$, the determining step (15) comprises a substep for determining the location (21) of the considered video image $I_{M1}$ in said overall image $I_s$.

In other words, a tracking operation is performed to match the current video image $I_{M1}$ to the overall image $I_s$ scene and determine its location.

A first example of implementation of such step of determining the location of the current video image $I_{M1}$ inside the overall image $I_s$ correspond to the case where said video image $I_{M1}$ and said overall image $I_s$ present a corresponding resolution (Res) and dynamic range (DR).

Thus as illustrated by FIG. 2, the two tests (211 and 212): $Res(I_M)=Res(I_S)$ and $DR(I_M)=DR(I_S)$ give a positive result "Yes".

In this case, the tracking is performed (213) using a distortion metrics, for example the sum of absolute difference (SAD):

$$Dist_{dx,dy}=\Sigma_{x=0}^{N-1}\Sigma_{y=0}^{M-1}\sqrt{(C(x,y)-S(x+dx,y+dy))^2} \quad (4)$$

where C represents a value of a predetermined metadata of said video image, S represents a value of said predetermined metadata of said overall image of height N and width M, (x, y) the coordinates of a starting point of said video image and (dx, dy) the coordinates of a tested location of said video image in said overall image.

Such tracking outputs said location of the current video image $I_{M1}$ inside the overall image $I_s$ corresponding to a point of said overall image, whose coordinates correspond to a couple (dx, dy) minimizing the distortion $Dist_{dx,dy}$, such coordinates defining for example the bottom left corner ($C_{BL}$ as represented in FIG. 1B) of the video image $I_{M1}$ inside the current video image $I_s$.

When only the resolution is different corresponding to the output "No" of the test (211) $Res(I_M)=Res(I_S)$, the distortion computation corresponding to equation (4) is calculated with different scaling "s" (2110), in other words using at least two different scaling $s_1$ and $s_2$.

In this case the triplet (dx, dy, s) that minimizes the distortion is the output of the match location.

When only the dynamic range is different corresponding to the output "No" of the test (212) $DR(I_M)=DR(I_S)$, it is first required to match the dynamic range of both inputs corresponding respectively to said current video image $I_{M1}$ and said overall image $I_s$ respectively.

As HDR values represent physical absolute values, expanding the dynamic range of one or both the input to achieve HDR values ensure that they can be compared afterwards.

To recover (2120) such physical values of an input image (video image and/or overall image) the first capture module (120), for example a camera, and/or the second capture module (121), for example a LizardQ® sensor, are calibrated (2121). As disclosed by MANN S. et al. ("On being "Undigital" With Digital Cameras: Extending dynamic Range by combining Differently Exposed Pictures"), in Proceedings of IS&T 46$^{th}$ annual conference (May 1995), pp 422-428, calibration consists in measuring the Camera Response Function (CRF) of the first capture module.

Once the CRF is known, it is possible to invert the non-linear transformation applied inside one of the capture module and to obtain the physical values, and in particular the luminance, of the image.

Finally, when both the resolution and the dynamic range are not corresponding between the current video image $I_{M1}$ and said overall image $I_s$, in other words when the two tests (211 and 212): $Res(I_M)=Res(I_S)$ and $DR(I_M)=DR(I_S)$ give a negative result "No" all the substeps of recovering physical values (2120), scaling (2110) and computing a distortion are applied on at least one or both video and overall images.

Once such a location of the considered video image $I_{M1}$ in said overall image $I_s$ has been determined, a cropping step (22) of the overall image $I_s$ can also be optionally implemented in order to reduce the field, which is used to determine the relevant luminance information $I_{lum}$.

Such a cropping step (22) delivers consequently a reduced overall image $I_{sr}$ and/or a reduced number of metadata Meta_$I_{sr}$ permitting to keep the only information $I_{lum}$ relevant for an optimal DR conversion (16).

It has to be noted that if the overall image $I_s$ presents a different dynamic range from the video image $I_{M1}$, a retargeting to the same dynamic range is performed. Such a retargeting is a simple correspondence of value as the location of the video image $I_{M1}$ in $I_s$ has been previously determined (21), and for values that need to be retargeted and that are not present in the considered video image $I_{M1}$, an extrapolation is performed.

Optionally, said cropping step could take into account the result of the preceding cropping step(s) implemented for processing the image(s) (or frames), which precede(s) the current considered frame.

Thus, the reduction of the area used for determining the luminance information would be optimized (in other words, increased), regarding the cropped overall image used for the preceding video images.

More precisely, when considering the second embodiment, where a ZBC analysis is implemented, taking into account the result of the preceding cropping step(s) implemented for processing the image(s) (or frames), which precede(s) the current considered frame would corresponds to remove from the histogram the values that disappear from the previous frame and add those of the current considered frame to reduce the computation time of the histogram.

Different criteria can be used, alone or in combination, to crop the overall image delivered by the second capture module (121).

A first criterion consists in extrapolating (221) the first capture module motion so as to predict what content will enter the video sequence in the near future following the instant $t_1$.

Regarding FIG. 1B, such a motion is for example represented by the motion curve 1200, thus the scope of the overall scene $I_s$ could be restricted to a reduced area limited by the maximum motion amplitude of some relevant pixels (for example the points of interest) of the considered video sequence.

Obtaining the motion prediction, consists in extracting the motion parameters of a first capture module from a sequence of images, for example considering a camera pan, tilt, zoom, roll and horizontal or vertical tracking. A method for obtaining such a motion prediction is for example described by SRINIVASAN M. V. et al. ("*Qualitative estimation of camera motion parameters from video sequences*"), Pattern Recognition, volume 30, Issue 4, April 1997, Pages 593-606.

Once, the motion parameters of the first capture module are estimated, the cropping step will use them to select what area of the overall image is useful.

For example, and as illustrated by FIG. 1B, if the motion of the first capture module corresponding to a camera is a simple horizontal travelling, there is no need to consider the luminance values of pixels of the overall image which are located outside a rectangle (a band delimited by dotted lines) $I_{sr}$ with a height $N_r$ close or equal to the height $N_1$ of the video image $I_{M1}$ and a width $M_r$ close or equal to the length of the horizontal motion vector delivered by the motion prediction.

Thus, considering the above example, a source of light located closed to the top right corner of the overall image $I_s$ would have no impact on the DR conversion (16) implemented by the invention.

In addition, taking into account the result of the preceding cropping step(s) implemented for processing the image(s) (or frames), which precede(s) the current considered frame, could also helps to reduce the time of the motion prediction step of said capture module.

A second criterion, taken into account alone or in combination, consists in extracting the capabilities of the first capture module to record the video images of the scene, in other words its degree of freedom. For example, considering the case of a sport game the capture angle C1 is restricted to focus on the football pitch (or field), thus the majority of the video images are focusing on a restricted place and there's no need to take into account the luminance value related with sky or with the top of the stadium.

Thus, taking into account this criterion would lead to a reduced overall image $I_{sr}$ with an area whose surface is relatively close to the one of the football field, and independently from the motion of the first capture module.

According to a third criterion, the reduced overall image could be obtained by using metadata entered by the user (223), who is for example a Director of Photography (DoP). Indeed, the Director of Photography knows in advance the scenario, which will be implemented for capturing each video image of the video sequence. Thus, the user can replace directly the motion prediction step (221) by entering directly the metadata that permits a direct crop of the overall image.

According to another variant, such metadata, entered by the user: the Director of Photography, could be used in combination with the motion prediction to increase the reduction of the overall image implemented automatically by the processor. For example, the Director of Photography could enter an area in the overall image Is of the scene as the brightest, in order to obtain an artistic rendering where all the rest of the scene would be rendered darker, creating thus an artistic effect like the one in the Batman movie "The Dark Knight".

Obviously and advantageously, it is also possible to implement a "skip" option, for example by means of a mechanical or digital button of an IHM of the device for processing a video sequence according to the invention, permitting to implements or not the previous steps of determining (21) the location of the considered video image in the overall image and of cropping (22), indeed, by selecting said "skip" option, a default mode could be implemented where the all the overall image can be considered.

5.5 Global Structures of a Device for Video Processing

Figure 4:
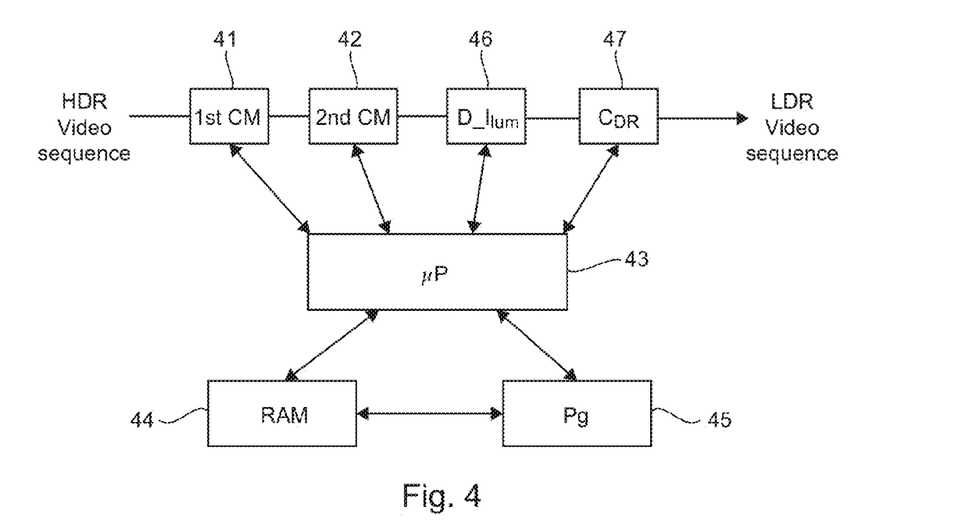
FIG. 4 presents the simplified structure of a device for processing a video sequence according to the invention.

Finally, FIG. 4 present a simplified structure of a device for processing a video sequence, implementing the method for processing a video sequence according to the invention.

Regarding FIG. 4, a device for processing a video sequence according to the invention comprises a memory 44 comprising a buffer memory RAM, a processing unit 43 equipped for example with a microprocessor μP and driven by the computer program 45 implementing the method for processing a video according to the invention.

At initialization, the code instructions of the computer program 45 are for example loaded into a RAM and then executed by the processor of the processing unit 43.

According to the invention, the microprocessor of the processing unit 43 implements the steps of the method for processing a video sequence described here above according to the instructions of the computer program 45. To this end, the device for processing a video sequence, comprises a first capture module (41) being able of obtaining at least one image, said at least one image representing a scene with a first capture angle (C1), said at least one image being called video image, a second capture module (42), said second capture module being different from said first capture module, and being able of obtaining metadata corresponding to at least one image representing said scene with a second capture angle (C2) strictly greater than said first capture angle, said at least one image being called overall image, said overall image comprising said video image, a determining module (46) for determining luminance information from said metadata corresponding to said overall image, a conversion module (47) for converting a dynamic range of said video image taking into account of said luminance information.

Said first capture module being arranged (or placed) on or near the second capture module.

Theses modules are controlled by the microprocessor of the processing unit 43.

The invention claimed is:

1. A method for processing a video sequence formed by at least two video images, said method comprising:
    obtaining said at least two video images using a first capture module with a first field of view, each video image representing a same scene captured at different instants or from different points of view,
    wherein said method further comprises:
    determining the location of at least one video image into at least one overall image obtained by a second capture module with a second field of view greater than said first field of view, said overall image representing the scene captured at different instants or from different points of view;
    determining luminance information from said at least one overall image and the location of said at least one video image into said at least one overall image;
    down-converting a dynamic range of said video images taking into account said luminance information
    the determining of the location of said at least one video image into said at least one overall image being performed by determining a distortion metric that corresponds to the following sum of absolute difference:

$$Dist_{dx,dy} = \sum_{x=0}^{N-1} \sum_{y=0}^{M-1} \sqrt{(C(x,y) - S(x+dx, y+dy))^2}$$

Where C represents a value of a determined metadata of said at least one video image, S represents a value of said determined metadata of said at least one overall image of height N and width M, (x,y) the coordinates of a starting point of said at least one video image and (dx, dy) the coordinates of a tested location of said at least one video image in said at least one overall image, said location corresponding to a point of said at least one overall image, whose coordinates correspond to a couple (dx, dy) minimizing the distortion $Dist_{x,y}$.

2. The method for processing a video sequence according to claim 1, wherein said distortion metrics is determined at least two times by applying each time a different scaling of their size to both said at least one video image and said at least one overall image.

3. The method for processing a video sequence according to claim 1, wherein the method further comprises, before said determining of the location of said at least one video image into said at least one overall image:
    calibrating by delivering a function between at least one code value of said at least one video image and at least one physical value, or delivering a function between at least one code value of said at least one overall image and at least one physical value,
    inverting said function delivering physical values of said at least one video image or of said at least one overall image.

4. The method for processing a video sequence according to claim 1, wherein said determining of the location of said at least one video image into said at least one overall image comprises cropping said at least one overall image.

5. The method for processing a video sequence according to claim 4, wherein said cropping comprises a step of motion prediction of said first capture module.

6. The method for processing a video sequence according to claim 4, wherein said cropping comprises a stop of determining of an image capture degree of freedom of said first capture module.

7. The method for processing a video sequence according to claim 4, wherein said cropping takes into account of metadata entered by a user.

8. The method for processing a video sequence according to claim 1, wherein said down-converting of a dynamic range of said at least one video image taking into account of said luminance information further comprises:
    a tone mapping of said at least one video image delivering at least one tone mapped image,
    a zonal brightness coherency analysing performed on said at least one overall image taking into account of said luminance information, delivering anchor zones of said at least one overall image;
    modifying said at least one tone mapped image of said at least one video image using said anchor zones of said at least one overall images, delivering at least one modified tone mapped image,
    a tonal level redistributing of said at least one video image using said modified tone mapped image;
    converting floating point values of said at least one video image to integer code values.

9. A non-transitory computer-readable medium having stored therein instructions for causing a processor to perform the method according to claim 1.

10. A device for processing a video sequence formed by at least two video images, said device comprising a first capture module being able of obtaining said at least two images with a first field of view, each video image representing a same scene captured at different instants or from different points of view,
    wherein said device comprises:
    a first determining module determining the location of said at least one video image into at least one overall image obtained by a second capture module-with a second field of view greater than said first capture angle, said overall image representing the scene captured at different instants or from different points of view;

a second determining module determining luminance information from said at least one overall image and the location of said at least one video image into said at least one overall image;

a down converting module for converting a dynamic range of said video images taking into account of said luminance information;

wherein the determining of the location of said at least one video image into said at least one overall image being performed by determining a distortion metric that corresponds to the following sum of absolute difference:

$$Dist_{dx,dy} = \sum_{x=0}^{N-1} \sum_{y=0}^{M-1} \sqrt{(C(x, y) - S(x + dx, y + dy))^2}$$

where C represents a value of a determined metadata of said at least one video image, S represents a value of said determined metadata of said at least one overall image of height N and width M, (x, y) the coordinates of a starting point of said at least one video image and (dx, dy) the coordinates of a tested location of said at least one video image in said at least one overall image, said location corresponding to a point of said at least one overall image, whose coordinates correspond to a couple (dx, dy) minimizing the distortion $Dist_{x,y}$.

11. The device of claim 10, wherein said first capture module and said second capture module have different capture frequencies for obtaining respectively said at least one video image and said at least one overall image.

12. The device of claim 10, wherein said distortion metrics is determined at least two times by applying each time a different scaling of their size to both said at least one video image and said at least one overall image.

13. The device of claim 10, wherein the device further comprises:

a calibration delivering module delivering a function between at least one code value of said video image and at least one physical value, or delivering a function between at least one code value of said overall image and at least one physical value; and an inverter of said function delivering physical values of said video image or of said overall image.

14. The device of claim 10, wherein the determining of the location of said at least one video image into said at least one overall image comprises cropping said at least one overall image.

15. The device of claim 14, wherein said cropping comprises a motion predictor of said first capture module.

16. The device of claim 14, wherein said cropping comprises determining an image capture degree of freedom of said first capture module.

17. The device of claim 14, wherein said cropping takes into account metadata entered by a user.

18. The device of claim 10, wherein said down-converting of a dynamic range of said video image taking into account of said luminance information comprises:

tone mapping of said at least one video image delivering at least one tone mapped image;

zonal brightness coherency analysing performed on said at least one overall image taking into account of said luminance information, delivering anchor zones of said at least one overall image, modifying said at least one tone mapped image of said at least one video image using said anchor zones of said at least one overall images, delivering at least one modified tone mapped image, tonal level redistributing said at least one video image using said modified tone mapped image, and converting floating point values of said at least one video image to integer code values.

19. The device of claim 10, wherein the second capture module is a camera system able to create panoramic or full spherical images with high resolution.

20. The device of claim 10, wherein the camera system is further configured to create panoramic or full spherical images with high resolution with high dynamic range.

* * * * *